(12) United States Patent
Egi et al.

(10) Patent No.: US 7,958,217 B2
(45) Date of Patent: Jun. 7, 2011

(54) JOB MANAGEMENT SYSTEM AND METHOD FOR MINIMIZING LOG DATA

(75) Inventors: Masashi Egi, Kokubunji (JP); Ken Naono, Tokyo (JP); Takao Sakurai, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 935 days.

(21) Appl. No.: 11/802,524

(22) Filed: May 23, 2007

(65) Prior Publication Data

US 2007/0282920 A1    Dec. 6, 2007

(30) Foreign Application Priority Data

May 30, 2006 (JP) .................................. 2006-149736

(51) Int. Cl.
*G06F 15/173* (2006.01)
(52) U.S. Cl. ........................................ 709/223; 709/224
(58) Field of Classification Search .......... 709/217–219, 709/223–224, 238, 246
See application file for complete search history.

(56) References Cited

U.S. PATENT DOCUMENTS

| | | | | |
|---|---|---|---|---|
| 6,052,395 | A * | 4/2000 | Chiba | 372/25 |
| 6,064,656 | A * | 5/2000 | Angal et al. | 370/254 |
| 6,836,799 | B1 * | 12/2004 | Philyaw et al. | 709/224 |
| 6,877,007 | B1 * | 4/2005 | Hentzel et al. | 709/224 |
| 6,978,303 | B1 * | 12/2005 | McCreesh et al. | 709/224 |
| 7,587,484 | B1 * | 9/2009 | Smith et al. | 709/224 |
| 7,617,253 | B2 * | 11/2009 | Prahlad et al. | 1/1 |
| 7,801,855 | B2 * | 9/2010 | Kim et al. | 707/625 |
| 2003/0040889 | A1 * | 2/2003 | Coffey et al. | 702/188 |
| 2005/0114528 | A1 * | 5/2005 | Suito | 709/228 |
| 2007/0277182 | A1 * | 11/2007 | Chen et al. | 719/315 |
| 2008/0183748 | A1 * | 7/2008 | Kamat | 707/103 R |

FOREIGN PATENT DOCUMENTS

JP    2002-163129    11/2000

* cited by examiner

*Primary Examiner* — Faruk Hamza
(74) *Attorney, Agent, or Firm* — Stites & Harbison, PLLC; Juan Carlos A. Marquez, Esq.

(57) ABSTRACT

Provided is a job management system includes: a terminal for executing a job, and for collecting operation information corresponding to respective operations executed by an operator; and a management server for managing the operation information collected by the terminal, the management server being connected to the terminal via a network, in which: the terminal transmits, to the management server, operation log data including the operation information capable of identifying the respective operations executed by the operator; and the management server stores, in advance, information indicating categories for the operation information and combinations thereof which are used for interpreting the operation information transmitted from the terminal as the corresponding operation executed by the operator with respect to the terminal, and selects categories for the operation information and a combination thereof which minimize a data size of the operation log data to be transmitted by the terminal.

8 Claims, 15 Drawing Sheets

| TIME | EVENT |
|---|---|
| 9:00:01.314 | E1 |
| 9:00:01.415 | E2 |
| 9:00:01.559 | E3 |
| 9:00:01.833 | E7 |
| 9:00:02.005 | E8 |
| 9:00:05.979 | E1 |
| 9:00:06.323 | E8 |
| 9:00:06.505 | E9 |
| ⋮ | ⋮ |

} TRANSLATION CONTENT S1 (rows 1-5)

} TRANSLATION CONTENT S9 (rows 6-8)

EVENT LOG 1200

*FIG. 4*

| TRANSLATION CONTENT (PC OPERATION PERFORMED BY TERMINAL OPERATOR) → EVENT ↓ | | S1 | S2 | S3 | S4 | S5 | S6 | S7 | S8 | S9 | LOG AMOUNT (MB/h) |
|---|---|---|---|---|---|---|---|---|---|---|---|
| PRESSURE APPLIED TO MOUSE BUTTON HAS BEEN DETECTED | E1 | 1 | 1 | 1 | 1 | 1 | 1 | 1 | 1 | 1 | 2.2 |
| MESSAGE INDICATING ACTIVATION OF WINDOW HAS BEEN DETECTED | E2 | 1 | 1 | 1 | 1 | 1 | 0 | 1 | 1 | 0 | 1.2 |
| MESSAGE INDICATING DEACTIVATION OF WINDOW HAS BEEN DETECTED | E3 | 1 | 1 | 1 | 0 | 0 | 0 | 1 | 1 | 0 | 0.9 |
| MESSAGE INDICATING CREATION OF WINDOW HAS BEEN DETECTED | E4 | 0 | 0 | 0 | 1 | 1 | 1 | 0 | 0 | 0 | 3.0 |
| MESSAGE INDICATING TERMINATION OF WINDOW HAS BEEN DETECTED | E5 | 0 | 0 | 0 | 0 | 0 | 0 | 1 | 1 | 0 | 3.0 |
| MESSAGE INDICATING CHANGE IN SIZE OF WINDOW HAS BEEN DETECTED | E6 | 0 | 0 | 1 | 1 | 1 | 0 | 1 | 0 | 0 | 0.4 |
| MESSAGE INDICATING RENDERING OF WINDOW HAS BEEN DETECTED | E7 | 1 | 1 | 1 | 1 | 0 | 1 | 1 | 0 | 1 | 6.0 |
| MESSAGE INDICATING MOVEMENT OF KEYBOARD FOCUS HAS BEEN DETECTED | E8 | 1 | 1 | 1 | 1 | 1 | 0 | 0 | 1 | 0 | 4.2 |
| MESSAGE INDICATING CHANGE IN WINDOW NAME HAS BEEN DETECTED | E9 | 0 | 0 | 0 | 0 | 0 | 1 | 0 | 0 | 1 | 0.7 |
| PRESSURE APPLIED TO BUTTON OF TOOL BAR HAS BEEN DETECTED | E10 | 0 | 1 | 0 | 1 | 0 | 0 | 0 | 0 | 0 | 0.1 |

S1: USER HAS SWITCHED BETWEEN ACTIVE WINDOWS BY CLICKING WINDOW
S2: USER HAS SWITCHED BETWEEN ACTIVE WINDOWS BY CLICKING TASK BAR
S3: USER HAS STORED WINDOW IN TASK BAR BY CLICKING MINIMIZATION BUTTON
S4: USER HAS ACTIVATED APPLICATION FROM TOOL BAR
S5: USER HAS ACTIVATED APPLICATION BY CLICKING FILE
S6: USER HAS OPENED FILE IN APPLICATION
S7: USER HAS ENDED APPLICATION
S8: USER HAS CLOSED WINDOW BY PRESSING CLOSING BUTTON
S9: USER HAS CLOSED FILE IN APPLICATION

EVENT TRANSLATION MAP 23

FIG. 5A

| TRANSLATION CONTENT | TRANSLATION RESOLUTION |
|---|---|
| S1 | class1 |
| S2 | class1 |
| S3 | class1 |
| S4 | class2 |
| S5 | class2 |
| S6 | class2 |
| S7 | class3 |
| S8 | class3 |
| S9 | class3 |

DESIRED TRANSLATION RESOLUTION 2000

FIG. 5B

| | | BINARY NUMBER FOR EACH EVENT | | | | | | | | | | LOG AMOUNT (MB/h) |
|---|---|---|---|---|---|---|---|---|---|---|---|---|
| | | E10 | E9 | E8 | E7 | E6 | E5 | E4 | E3 | E2 | E1 | |
| EVENT CONFIGURATION | #1 | 0 | 0 | 0 | 0 | 0 | 0 | 0 | 0 | 0 | 1 | 2.2 |
| | #2 | 0 | 0 | 0 | 0 | 0 | 0 | 0 | 0 | 1 | 0 | 1.2 |
| | #3 | 0 | 0 | 0 | 0 | 0 | 0 | 0 | 0 | 1 | 1 | 3.4 |
| | ⋮ | ⋮ | ⋮ | ⋮ | ⋮ | ⋮ | ⋮ | ⋮ | ⋮ | ⋮ | ⋮ | ⋮ |
| | #137 | 0 | 0 | 1 | 0 | 0 | 0 | 1 | 0 | 0 | 1 | 9.4 |
| | #138 | 0 | 0 | 1 | 0 | 0 | 0 | 1 | 0 | 1 | 0 | 8.4 |
| | ⋮ | ⋮ | ⋮ | ⋮ | ⋮ | ⋮ | ⋮ | ⋮ | ⋮ | ⋮ | ⋮ | ⋮ |
| | #284 | 0 | 1 | 0 | 0 | 0 | 1 | 1 | 1 | 0 | 0 | 7.6 |
| | ⋮ | ⋮ | ⋮ | ⋮ | ⋮ | ⋮ | ⋮ | ⋮ | ⋮ | ⋮ | ⋮ | ⋮ |
| | #1021 | 1 | 1 | 1 | 1 | 1 | 1 | 1 | 1 | 0 | 1 | 30.5 |
| | #1022 | 1 | 1 | 1 | 1 | 1 | 1 | 1 | 1 | 1 | 0 | 29.5 |
| | #1023 | 1 | 1 | 1 | 1 | 1 | 1 | 1 | 1 | 1 | 1 | 31.7 |

EVENT CONFIGURATION TABLE 2301

FIG. 7A

| #3 | class | E2 | E1 | DECIMAL NOTATION VALUE |
|---|---|---|---|---|
| S1 | class1 | 1 | 1 | 3 |
| S2 | class1 | 1 | 1 | 3 |
| S3 | class1 | 1 | 1 | 3 |
| S4 | class2 | 1 | 1 | 3 |
| S5 | class2 | 1 | 1 | 3 |
| S6 | class2 | 1 | 1 | 3 |
| S7 | class3 | 1 | 1 | 3 |
| S8 | class3 | 0 | 1 | 1 |
| S9 | class3 | 0 | 1 | 1 |

*FIG. 7B*

| #138 | class | E8 | E4 | E2 | DECIMAL NOTATION VALUE |
|---|---|---|---|---|---|
| S1 | class1 | 1 | 0 | 1 | 5 |
| S2 | class1 | 1 | 0 | 1 | 5 |
| S3 | class1 | 1 | 0 | 1 | 5 |
| S4 | class2 | 1 | 1 | 1 | 7 |
| S5 | class2 | 1 | 1 | 1 | 7 |
| S6 | class2 | 1 | 1 | 0 | 6 |
| S7 | class3 | 0 | 0 | 1 | 1 |
| S8 | class3 | 0 | 0 | 1 | 1 |
| S9 | class3 | 1 | 0 | 0 | 4 |

*FIG. 7C*

| #284 | class | E9 | E5 | E4 | E3 | DECIMAL NOTATION VALUE |
|---|---|---|---|---|---|---|
| S1 | class1 | 0 | 0 | 0 | 1 | 1 |
| S2 | class1 | 0 | 0 | 0 | 1 | 1 |
| S3 | class1 | 0 | 0 | 0 | 1 | 1 |
| S4 | class2 | 0 | 0 | 1 | 0 | 2 |
| S5 | class2 | 0 | 0 | 1 | 0 | 2 |
| S6 | class2 | 1 | 0 | 1 | 0 | 10 |
| S7 | class3 | 0 | 1 | 0 | 1 | 5 |
| S8 | class3 | 0 | 1 | 0 | 1 | 5 |
| S9 | class3 | 1 | 0 | 0 | 0 | 8 |

FIG. 7D

| EVENT CONFIGURATION | JUDGMENT RESULT |
|---|---|
| #1 | × |
| #2 | × |
| #3 | × |
| ⋮ | ⋮ |
| #137 | × |
| #138 | ○ |
| ⋮ | ⋮ |
| #284 | ○ |
| ⋮ | ⋮ |
| #1021 | ○ |
| #1022 | ○ |
| #1023 | ○ |

FIG. 7E

JOB MANAGEMENT SYSTEM AND METHOD FOR MINIMIZING LOG DATA

CLAIM OF PRIORITY

The present application claims priority from Japanese patent application JP 2006-149736 filed on May 30, 2006, the content of which is hereby incorporated by reference into this application.

BACKGROUND OF THE INVENTION

This invention relates to a job management system capable of minimizing a data amount of event logs created by a target device.

In a computer system which includes a user computer and a server computer connected to each other via a network so as to be capable of communicating with each other, it is demanded that logs created by the user computer be collected to thereby keep track of the history of various activities of the user computer based on the logs thus collected. In particular, there is an increasing need for learning a job status of a user in view of, for example, increasing job efficiency, enhancing compliance, and the implementation of Japanese Sarbanes-Oxley Act (J-SOX act) in the background. Above all, it is in high needs to monitor a job status on a user side which is represented by operations on a computer executed by the user.

In order to learn the job status on the user side, the server computer needs to collect and analyze event logs of a client computer used by the user, or event logs, which characterize user activities, obtained by a device such as a sensor. Each one of the events recorded as the event logs on the user side holds no meaning until a plurality of the events are compiled so as to be interpreted as a meaningful job. Under the circumstances, a log amount for monitoring a job status on the user side tends to be increased to an enormous amount, and therefore there is a demand for a technique capable of reducing the log amount to an appropriate amount.

There has been known a technique disclosed in JP 2002-163129 A as the technique of reducing the log amount to an appropriate amount. Specifically, a log level defining method is disclosed, in which an application program AP defines, by an initialization processing unit, the log level that can be used by the application program as a whole, delivers, to a log level input unit of a processing unit A, the value of the log level selected by the user for use in the processing unit A, as an input, and acquires the logs on the specified level during process for achieving the primary purpose of the application program on another processing unit of the processing unit A The log information thus acquired is output to an external storage device or an input/output device by a log output processing unit.

JP 2002-163129 A discloses a technique of reducing the log amount to an appropriate amount, with respect to the event logs relating to the operating status of the application program. According to this technique, upon start-up of the application program, the processing unit A reads the log level specified by an administrator, and outputs, from then on, only a log conforming to the specified log level, to the external storage device.

When the technique disclosed in JP 2002-163129 A is applied for learning the job status on the user side, the administrator needs to specify information corresponding to the log level, in other words, information specifying the events to be output and the events not to be output. As described above, however, in learning a job status on the user side, each one of the events holds no meaning until a plurality of the events are compiled so as to be interpreted as one piece of meaningful job performance information. Accordingly, the administrator needs to create specifying information for setting ON/OFF to the event output as described above so as to minimize the log amount, based on the kind of job performance information the administrator needs to obtain. However, in order to perform this work in consideration of correspondence between several hundred kinds of jobs and several hundred kinds of job performance information, a large amount of labor is imposed on the administrator.

This invention has been made in view of the above-mentioned problems, and therefore, it is an object of the invention to provide a job management system for deciding categories for log data and a combination thereof, which at least include information needed by an administrator side while keeping a data amount of the log data minimum.

SUMMARY OF THE INVENTION

A representative aspect of this invention is as follows. That is, there is provided a job management system, comprising: a terminal for executing a job, and for collecting operation information corresponding to respective operations executed by an operator; and a management server for managing the operation information collected by the terminal, the management server being connected to the terminal via a network: in which the terminal transmits, to the management server, operation log data including the operation information capable of identifying the corresponding operations executed by the operator; in which the management server stores, in advance, information indicating categories for the operation information and combinations thereof which are used for interpreting the operation information transmitted from the terminal as the corresponding operation executed by the operator with respect to the terminal; and in which the management server selects categories for the operation information and a combination thereof which minimize a data size of the operation log data to be transmitted by the terminal.

According to this invention, a management server is capable of setting automatically categories for the operation information and a combination thereof included in operation log data, such that a data amount of the operation log data to be transmitted from a terminal is kept minimum.

BRIEF DESCRIPTION OF THE DRAWINGS

The present invention can be appreciated by the description which follows in conjunction with the following figures, wherein:

FIG. 4 is an explanatory diagram of an event log created by an event output unit in accordance with the first embodiment of this invention;

FIG. 5A is an explanatory diagram of an event translation map in accordance with the first embodiment of this invention;

FIG. 5B is an explanatory diagram of a desired translation resolution in accordance with the first embodiment of this invention;

FIG. 7A is an explanatory diagram of an event configuration table in accordance with the first embodiment of this invention;

FIG. 7B is an explanatory diagram of an event configuration #3 in accordance with the first embodiment of this invention;

FIG. 7C is an explanatory diagram of an event configuration #138 in accordance with the first embodiment of this invention;

FIG. 7D is an explanatory diagram of an event configuration #284 in accordance with the first embodiment of this invention;

FIG. 7E is an explanatory diagram showing a results of a judgment of a desired translation resolution in accordance with the first embodiment of this invention;

DETAILED DESCRIPTION OF THE PREFERRED EMBODIMENTS

Hereinbelow, embodiments of this invention will be described with reference to the accompanying drawings.

First Embodiment

Figure 1:
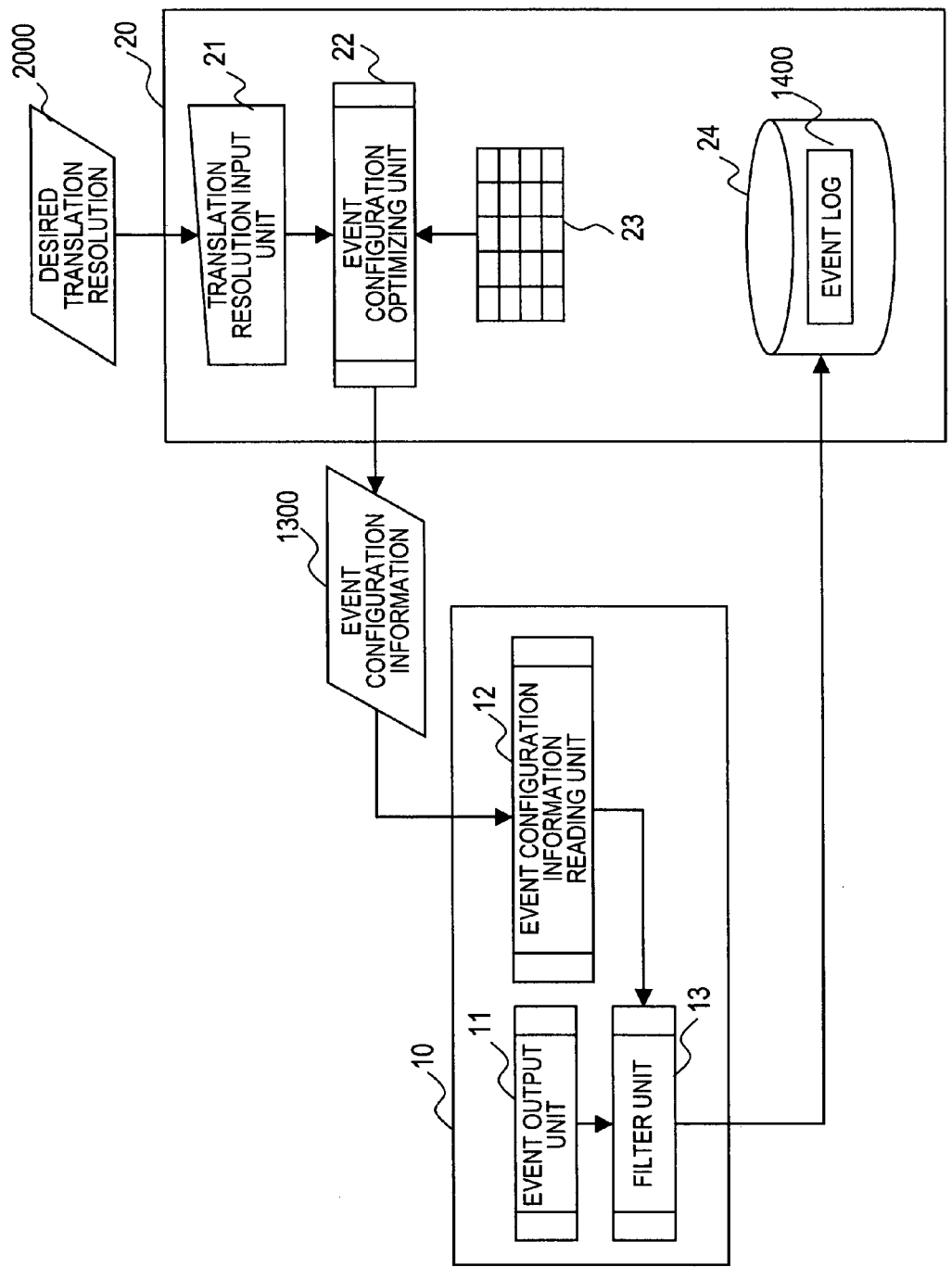
FIG. 1 is an explanatory diagram showing an outline of a job management system in accordance with to a first embodiment of this invention.

FIG. 1 is an explanatory diagram showing an outline of a job management system according to a first embodiment of this invention.

The jog management system according to this embodiment includes a personal computer 10 and a management server 20 for managing logs created by the personal computer 10.

The personal computer (hereinafter, referred to as PC) 10 includes an event output unit 11, an event configuration information reading unit 12, and a filter unit 13. The management server 20 includes a translation resolution input unit 21, an event configuration optimizing unit 22, an event translation map 23, and a disk device 24.

In the PC 10, when an operator operating the PC 10 has executed an operation, the event output unit 11 outputs event logs corresponding to the respective operations. The filter unit 13 filters the event logs output by the event output unit 11 by using information indicated by the event configuration information reading unit 12, and outputs the filtered event logs. As a result, the PC 10 outputs only event logs which have been filtered based on the event configuration information. The event logs thus output are transmitted to the management server 20, and stored in the disk device 24 of the management server 20.

Meanwhile, the management server 20 creates the aforementioned event configuration information and stores the event logs transmitted from the PC 10.

An administrator managing the job management system of this embodiment inputs a desired translation resolution to the management server 20. The desired translation resolution refers to information for setting an accuracy for event logs among all the event logs thus received, the accuracy satisfying the degree of translation accuracy of the contents needed by the administrator. The event log output unit 11 momentarily outputs event logs in large amount in accordance with the status of the PC 10, while the administrator does not need all of the event logs thus output. Therefore, the administrator inputs the desired translation resolution to the management server 20, so that the event logs output include only the ones filtered according to the translation resolution desired by the administrator.

The translation resolution input unit 21 receives the desired translation resolution thus input, and transmits the received translation resolution to the event configuration optimizing unit 22. The event configuration optimizing unit 22 creates event configuration information based on an event translation map 23 which is stored in advance and the desired translation resolution thus received, and transmits, to the PC 10, the event configuration information thus created.

The event translation map 23 includes information indicating the content to be obtained by translating a combination of the event logs thus received. The management server 20 holds in advance the event translation map 23.

As described above, the management server 20 creates the event configuration information based on the desired translation resolution and the event translation map 23, and transmits the event configuration information to the PC 10. The PC 10 filters the created event logs based on the event configuration information thus received, and transmits the filtered event logs to the management server 20. According to the abovementioned configuration, only the event logs having a minimum amount of data needed by the administrator are transmitted to the management server 20.

Figure 2:
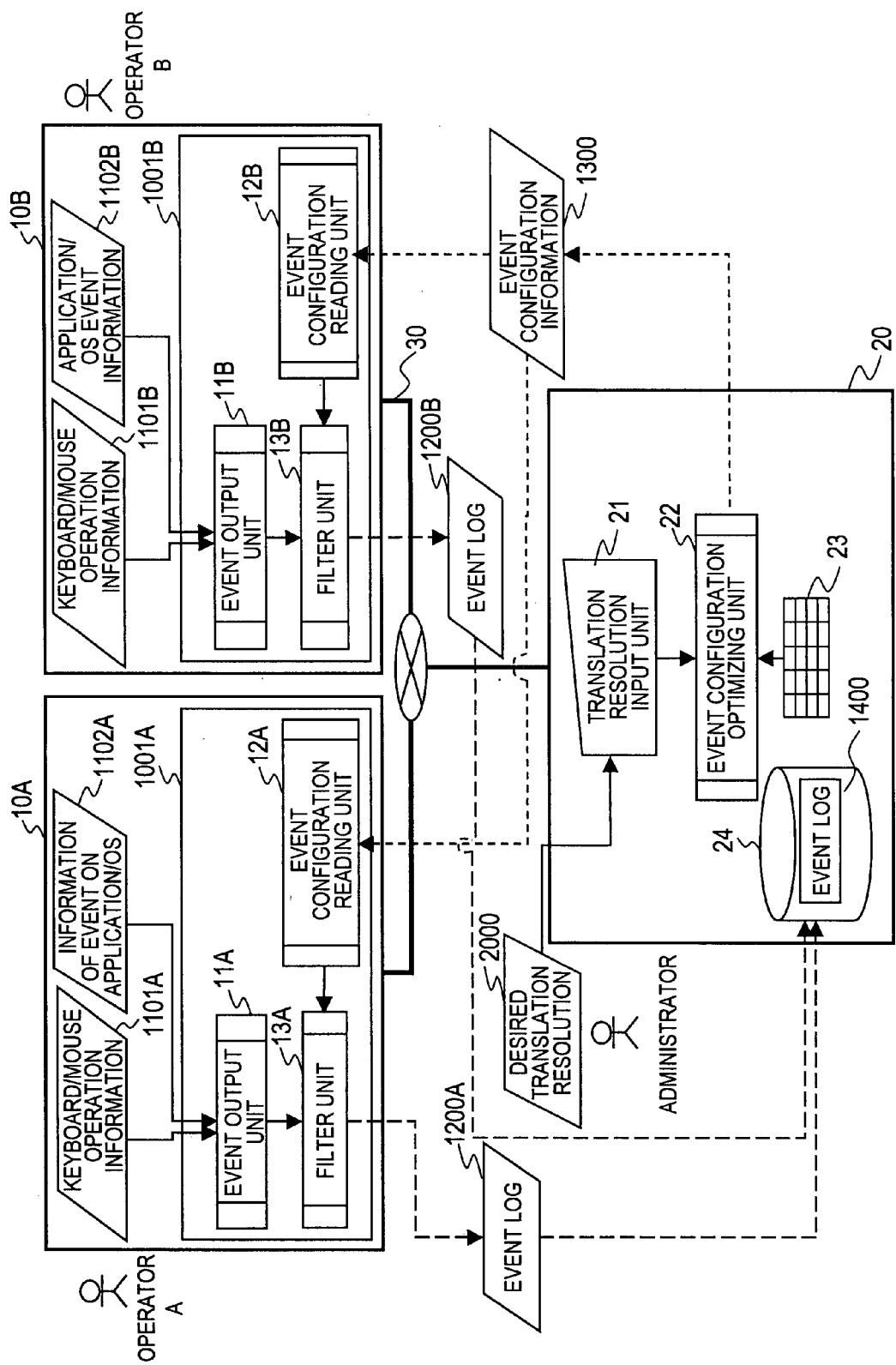
FIG. 2 is a functional block diagram of the job management system in accordance with the first embodiment of this invention.

FIG. 2 is a functional block diagram of the job management system of this embodiment.

The job management system of this embodiment includes two PCs 10A and 10B, and the management server 20, which are connected to one another via a communication network 30.

The PC 10A is an operation terminal operated by an operator A operating a job executed on the PC 10A. An operation monitor program 1001A is run on the PC 10A. The operation monitor program 1001A includes an event output unit 11A, an event configuration information reading unit 12A, and a filter unit 13A.

When the operator A has operated a keyboard or a mouse connected to the PC 10A, keyboard/mouse operation information 1101A is created, and the keyboard/mouse operation information 1001A thus created is transmitted to the event output unit 11A. When the operator A has operated an application or an operating system (hereinafter, described as "OS") on the PC 10A, application/OS event information 1102A is created, and the application/OS event information 1102A thus created is transmitted to the event output unit 11A.

When receiving the keyboard/mouse operation information 1101A or the application/OS event information 1102A, the event output unit 11A adds the time to each item of the information at which the item of information is created, and arranges the items of information in chronological order, to thereby create event logs. The event output unit 11A then transmits the event logs thus created to the filter unit 13A. The filter unit 13A filters the received event logs, based on event configuration information 1300 received by the event configuration information reading unit 12A, and transmits the event logs 1200A thus filtered to the management server 20.

Similarly, in the PC 10B, keyboard/mouse operation information 1101B or application/OS event information 1102B created as a result of the operation of the PC 10B effected by a operator B is transmitted to an event output unit 11B. The event output unit 11B creates event logs based thereon. The event logs thus created is filtered by a filter unit 13B based on the event configuration information 1300 received by an event configuration information reading unit 12B, and transmits the event logs 1200B thus filtered to the management server 20.

The management server 20 stores, in the disk device 24, the event logs 1200A and 1200B thus received, as an event log 1400.

Hereinafter, the PCs 10A and 10B are merely described as PC 10 unless otherwise particularly specified. Similarly, each constituent element in the PC 10A and in PC 10B is described without reference symbol of A or B.

In the management server 20, the translation resolution input unit 21 receives a desired translation resolution 2000 input by the administrator. The translation resolution input unit 21 transmits the desired translation resolution 2000 thus received to the event configuration optimizing unit 22. The event configuration optimizing unit 22 creates event configuration information 1300 based on the desired translation resolution 2000 thus received and the event translation map 23 which is stored in advance. The event configuration optimizing unit 22 transmits the event configuration information 1300 thus created to the PC 10A and to PC 10B.

Figure 3A:
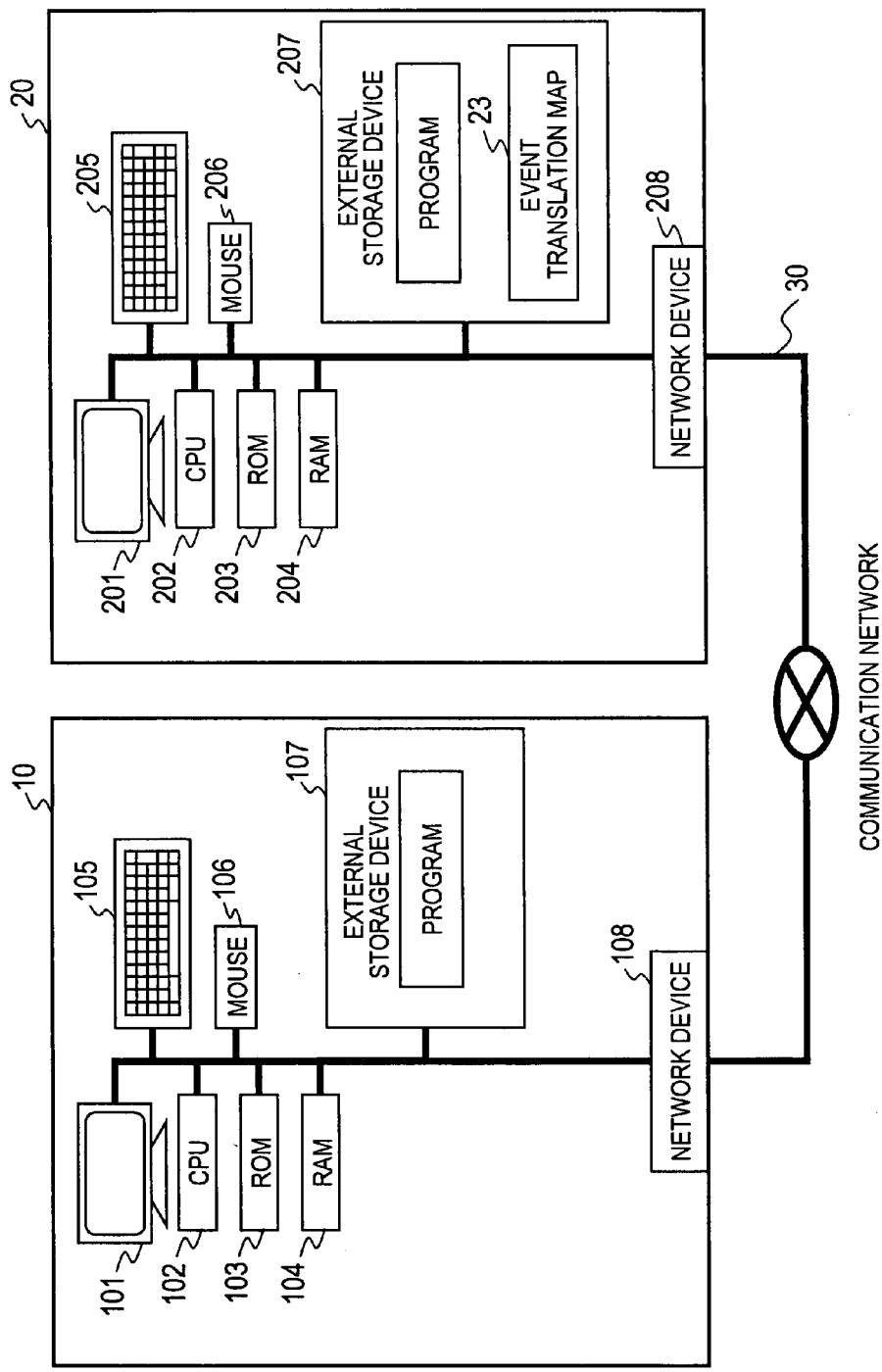
FIG. 3A is a explanatory diagram of a hardware configuration of the job management system in accordance with the first embodiment of this invention.
Figure 3B:
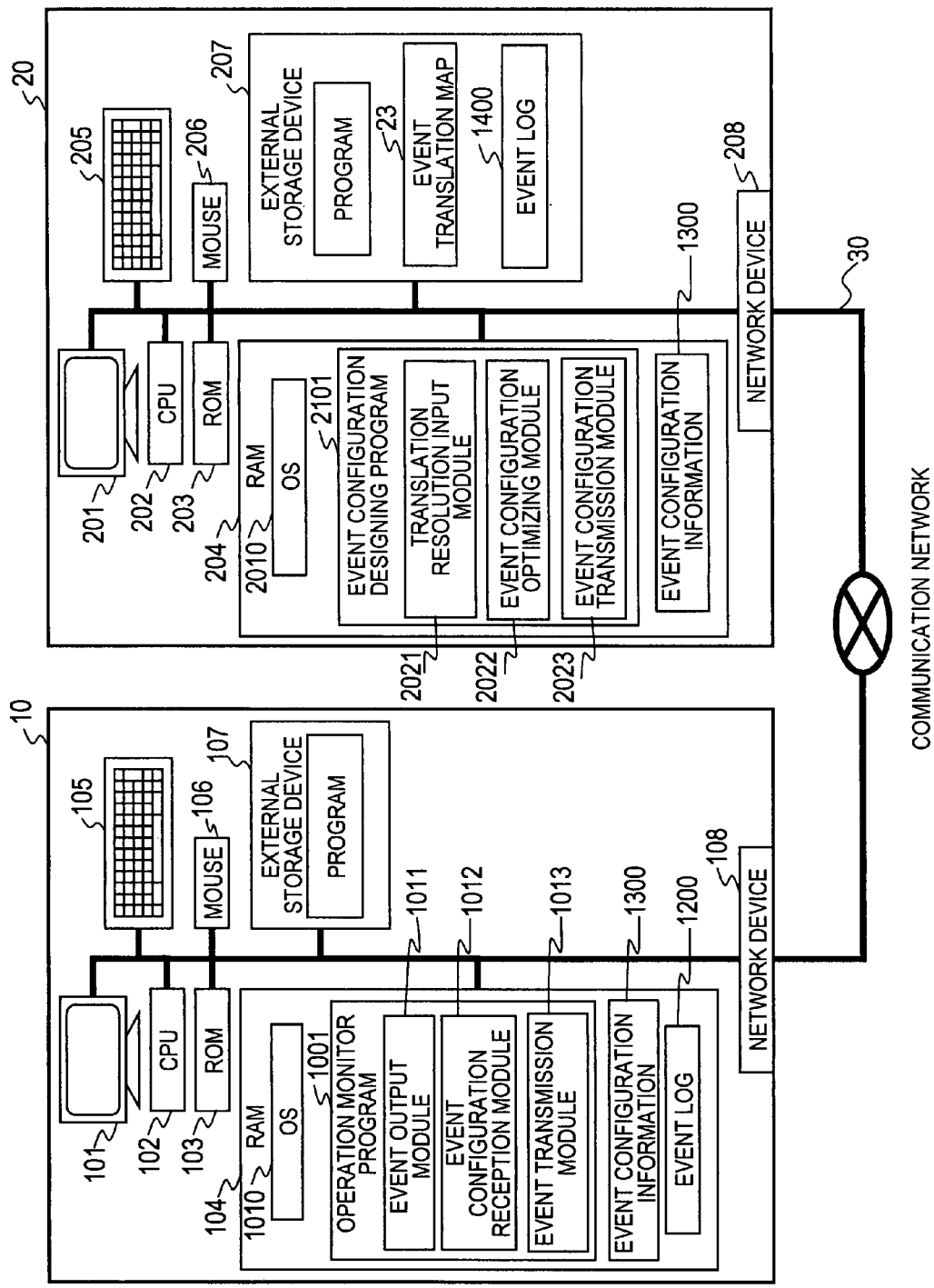
FIG. 3B is a explanatory diagram of a hardware configuration of the job management system in accordance with the first embodiment of this invention.

FIG. 3A and FIG. 3B each are an explanatory diagram of a hardware configuration of the job management system according to this embodiment.

FIG. 3A shows a state before the PC 10 and the management server 20 are started (for example, before the power is turned on).

The PC 10 includes a display 101, a CPU 102, a ROM 103, a RAM 104, a keyboard 105, a mouse 106, an external storage device 107, and a network device 108.

The display 101 displays the status of OS or of an application of the PC 10 and the result of execution thereof. The CPU 102 executes BIOS or a program stored in the ROM 103 or a program stored in the external storage device 107. The RAM 104 is used as a work area on which the CPU 102 executes a program, or as a temporary storage area for storing data used by the program.

The external storage device 107 stores a program for implementing OS, an application, or the like to be executed on the PC 10, and data or the like to be used by the program. The external storage device 107 includes, for example, a hard disk device. The external storage device 107 may not necessarily be provided within the casing of the PC 10. A storage device such as a NAS device connected to the communication network 30 may be used as the external storage device 107.

The network device 108 is connected to the communication network 30, and exchanges data between the management server 20 via the communication network 30.

The management server 20 includes a display 201, a CPU 202, a ROM 203, a RAM 204, a keyboard 205, a mouse 206, an external storage device 207, and a network device 208.

The display 201 displays the status of OS or an application of the management server 20 and the result of execution thereof. The CPU 202 executes BIOS or a program stored in the ROM 203 or a program stored in the external storage device 207. The RAM 204 is used as a work area on which the CPU 202 executes a program, or as a temporary storage area for storing data used by the program.

The external storage device 207 stores a program for implementing OS, an application, or the like to be executed on the management server 20, and data or the like to be used by the program. The external storage device 207 includes, for example, a hard disk device. The external storage device 207 may not necessarily be provided within the casing of the management server 20. A storage device such as a NAS device connected to the communication network 30 may be used as the external storage device 207.

The network device 208 is connected to the communication network 30, and exchanges data between the PC 10 via the communication network 30.

FIG. 3B shows a state in which the PC 10 and the management server 20 are started, on which a program or the like is being operated.

When the PC 10 is started, the PC 10 reads out the BIOS or the program stored in the ROM 103 or the program stored in the external storage device 107, and stores the program thus read out in the RAM 104. In the RAM 104, the aforementioned operation monitor program 1001 and OS 1010 for executing the operation monitor program 1001 are stored, which are executed by the CPU 102.

The operation monitor program 1001 includes an event output module 1011, an event configuration reception module 1012, and an event transmission module 1013. Those modules are each executed by the CPU 102, to thereby function as the event input unit 11, the event configuration information reading unit 12, and the filter unit 13, respectively.

Also, in the RAM 104, the event configuration information 1300 transmitted from the management server 20 and the event log 1400 created are stored.

When the management server 20 is started, the management server 20 reads out the BIOS or the program stored in the ROM 203 or the program stored in the external storage device 207, and stores, in the RAM 204, the program thus read out. In the RAM 204, the aforementioned event configuration designing unit 2101 and OS 2010 for executing the event configuration designing unit 2101 are stored, which are executed by the CPU 202.

The event configuration designing program 2101 includes a translation resolution input module 2021, an event configuration optimizing module 2022, and an event configuration transmission module 2023. Those modules are each executed by the CPU 202, to thereby function as the translation resolution input unit 21, the event configuration optimizing unit 22, and an event configuration transmission unit 25, respectively.

Also, in the RAM 204, the event configuration information 1300 transmitted from the management server 20 and the event log 1400 created are stored.

FIG. 4 is an explanatory diagram of an example of an event log created by the event output unit.

The event log is created by including pairs of a time and an event that is created at the time arranged in chronological order.

As described above, event logs are momentarily created in the PC 10 based on the operation executed by an operator. Each one of the event logs holds no meaning until a plurality of the event logs are compiled so as to be interpreted as one operation. According to this invention, to interpret the plurality of event logs as the content of one operation as described above will be referred to as "translation".

The example of FIG. 4 indicates that it is not until an event "E1" created at a time of "9:00:01.314", an event "E2" created at a time of "9:00:01.415", an event "E3" created at a time of "9:00:01.559", an event "E7" created at a time of "9:00:01.833", and an event "E8" created at a time of "9:00:

02.005" are combined together that those events are translated as a content of "S1" which is meaningful to the administrator.

FIG. 5A is an explanatory diagram of an example of the event translation map 23.

The event translation map 23 includes information indicating the contents to be obtained by translating various combinations of the event logs created by the PC 10.

The example of FIG. 5A shows correspondence between the contents of the events E1 to E10 and the translation contents S1 to S9 which are obtained by translating various combinations of the events.

Specifically, a combination of "a message indicating a change in a window name has been detected" (event E9), "a message indicating a movement of a keyboard focus has been detected" (event E8), and "the pressure applied to the mouse switch has been detected" (event E1) is translated as the translation content of "a user has closed a file in an application" (translation content S9).

Each event stores a log amount corresponding to the event in units of megabyte/hour. The log amount is associated with each of the event logs to be created by the PC 10 which are obtained in advance by a statistical method, and stored in the event translation map 23. The log amount is used for minimizing a data amount of event logs to be transmitted from the PC 10 at the time of calculating the event configuration information as described later.

As described above, the management server 20 stores in advance the event translation map 23 which includes information indicating the contents to be obtained by translating various combinations of the event logs.

FIG. 5B is an explanatory diagram of an example of the desired translation resolution 2000 input by the administrator.

The administrator does not need all of the event logs created by the PC 10, but needs the translation contents obtained by translating various combinations of the event logs. Further, the administrator does not need all the translation contents corresponding to all the operations of the PC 10, as long as the translation contents corresponding to only the necessary operations of all the operations of the PC 10 can be obtained.

For this reason, the administrator sets the accuracy of the translation contents necessary. In this invention, the accuracy is referred to as "resolution". More specifically, translation contents which do not need to be categorized as different from one another, in other words, translation contents which are interpreted as identical with one another, are grouped in one group. This group is referred to as translation resolution. In this embodiment, respective translation resolutions are each denoted by an identifier of "class".

According to the example of FIG. 5B, it is not necessary to distinguish the translation contents S1, S2, and S3 from one another, however, when the translation contents S1, S2, and S3 are grouped to form one translation content, the translation content needs to be distinguished from another translation content. Accordingly, the translation contents S1, S2, and S3 are each specified by a translation resolution of "class 1". Similarly, it is not necessary to distinguish the translation contents S4, S5, and S6 from one another, however, when the translation contents S4, S5, and S6 are grouped to form one translation content, the translation content needs to be distinguished from another translation content, and therefore the translation contents S4, S5, and S6 are each specified by a translation resolution of "class 2". Also, it is not necessary to distinguish the translation contents S7, S8, and S9 from one another, however, when the translation contents S7, S8, and S9 are grouped to form one translation content, the translation content needs to be distinguished from another translation content, and therefore the translation contents S7, S8, and S9 are each specified by a translation resolution of "class 3".

As a result, despite the fact that the event logs received by the management server 20 should originally be categorized into nine translation contents of S1 to S9, the event logs are categorized into only three categories of class 1 to class 3 when specified by the translation resolutions. Those three categories satisfy the need of the administrator.

Figure 6:
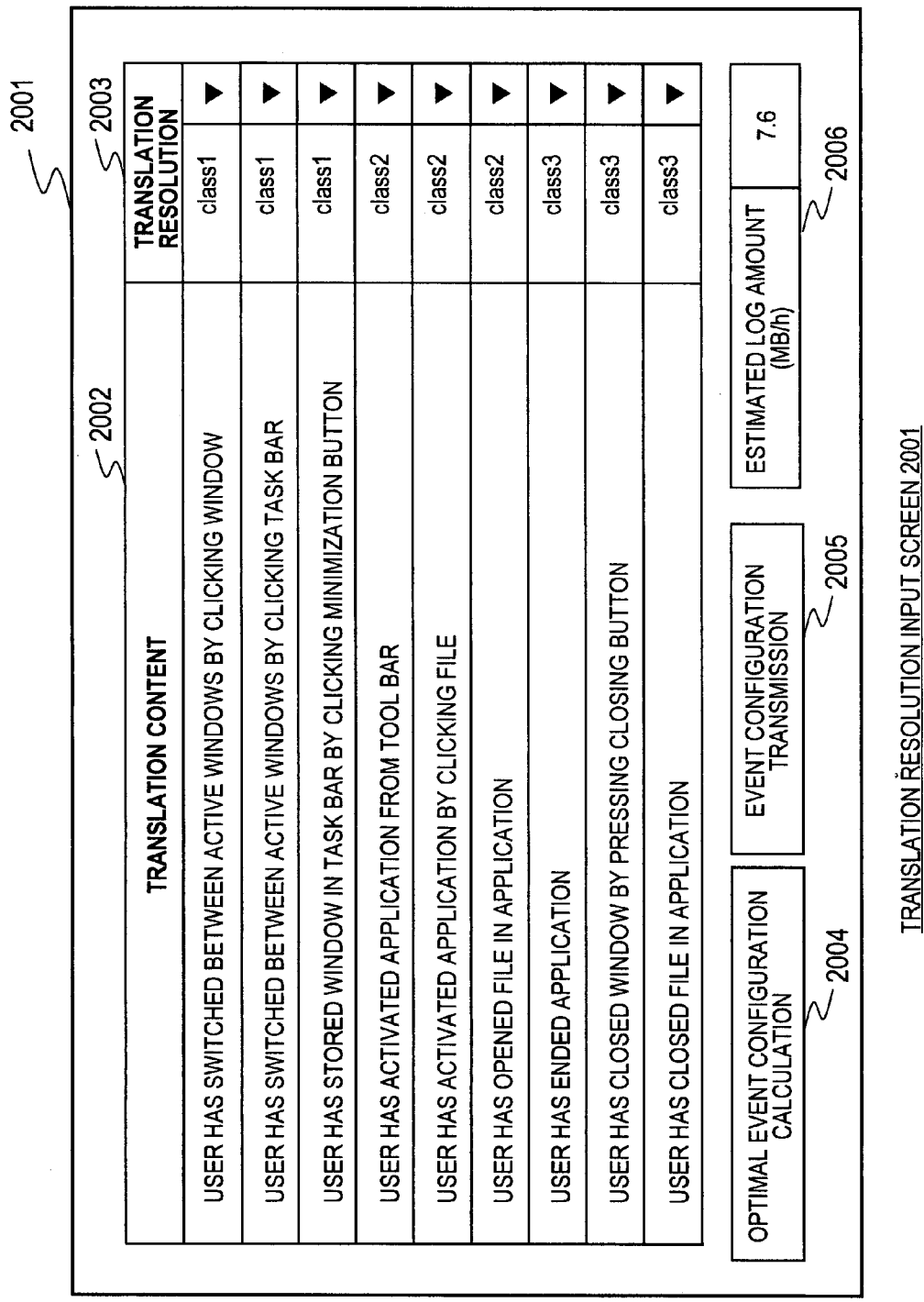
FIG. 6 is an explanatory diagram of a translation resolution input screen in accordance with the first embodiment of this invention.

FIG. 6 is an explanatory diagram of an example of a translation resolution input screen 2001 displayed on the display 201 of the management server 20.

The administrator inputs the aforementioned desired translation resolution 2000 through the translation resolution input screen 2001 displayed on the display 201.

The translation resolution input screen 2001 includes a translation content field 2002, a translation resolution field 2003, an optimal event configuration calculation button 2004, an event configuration transmission button 2005, and an estimated log amount field 2006.

Displayed in the translation content field 2002 are translation contents included in the event translation map 23 held by the management server 20. All the translation contents may not necessarily be displayed at one time, but may partially be displayed through scrolling or the like. The translation resolution field 2003 includes a pull-down menu box. The administrator manipulates the mouse 206 to select a translation resolution from the pull-down menu box, to thereby select a translation resolution for the corresponding translation content.

The optimal event configuration calculation button 2004 is for causing the management server 20 to execute a calculation process of calculating an optimal event configuration as described later, when the optimal event configuration button 2004 is pressed by the administrator through the manipulation of the mouse 206 after the translation resolution has been selected.

The event configuration transmission button 2005 is for transmitting, to the PC 10, the event configuration information 1300 created by the management server 20 when the event configuration transmission button 2005 is pressed by the administrator through the manipulation of the mouse 206.

The estimated log amount field 2006 displays an estimated log amount of the event logs in a unit of megabyte/hour, the event logs having been filtered by the event configuration information 1300 created based on the optimal event configuration calculation process.

The administrator manipulates the translation resolution input screen 2001 to input the desired translation resolution 2000 to the management server 20.

Next, the optimal event configuration calculation process will be described.

When the administrator presses the optimal event configuration calculation button 2004 after inputting the desired translation resolution 2000, the event configuration optimizing unit 22 of the management server 20 executes the optimal event configuration calculation process. As a result of the optimal event configuration calculation process, event configuration information which satisfies the desired translation resolution with a minimum log amount is obtained.

This optimal event configuration calculation process is executed through the processes described below.

First, the event configuration optimizing unit 22 extracts all the combinations of all the events stored in the event translation map 23, to thereby create an event configuration table shown in FIG. 7A. In the event configuration table, all the combinations of all the events are expressed by 1 or 0 of a binary number. For example, according to the example of FIG. 7A, the table includes all the combinations of events E1 to E10, in other words, 1024 combinations (#0 to #1023) obtained by raising 10 to the second power. Each of the combinations is referred to as "event configuration".

The event configuration information to be transmitted to the PC 10 includes one of the event configurations. The event configurations each have a binary number of 1 or 0, with respect to each event. The binary number of 1 indicates that the event is valid. The binary number of 0 indicates that the event is invalid (discard). The filter unit of the PC 10 calculates a logical product of a created event log and the event configuration. As a result of the calculation, an event which includes an event configuration of 0 is discarded while an event which includes an event configuration of 1 is transmitted to the management server 20 as a valid event, in other words, an event log. In other words, the event logs created by the PC 10 are filtered based on the event configuration information including an event configuration transmitted by the management server 20, to thereby decide categories for the events or a combination thereof to be transmitted from the PC 10.

Further, the event configuration optimizing unit 22 calculates log amounts corresponding to the respective event configurations, and adds the log amounts to the event configuration table.

Next, the event optimizing unit 22 judges, with respect to the respective event configurations, whether the event configuration satisfies the desired translation resolution. Specifically, the following process is executed.

First, the event configuration #3 will be described.

In the event configuration #3, within all of the events, 1 is set for the events E1 and E2, while 0 is set for each of the rest of the events E3 to E10. In other words, the event configuration #3 includes information for receiving only the event E1 and the event E2.

The event configuration optimizing unit 22 refers to the event translation map 23 to see how the valid events E1 and E2 included in the event configuration #3 are used in each of the translation contents S1 to S9. Then, the event configuration optimizing unit 22 further judges whether the translation contents set to the same class by a translation resolution can be distinguished from another translation content set to another class, by comparing the binary numbers corresponding to the respective translation contents.

FIG. 7B is an explanatory diagram showing the translation content of the event configuration #3, the binary numbers of the respective events in the event configuration, and values obtained by converting the binary numbers to decimal numbers (decimal notation value) to make it easier to understand the result of the judgment.

S1, S2, and S3 are each set to class 1 by the desired translation resolution. S4, S5, and S6 are each set to class 2. S7, S8, and S9 are set to class 3. Accordingly, as long as those classes are different from one another in terms of event configurations, at least the difference between the classes can be identified. In this example, 3 in decimal notation value is included in each of class 1, class 2, and class 3, which means that the classes include redundant values when represented in decimal notation. In other words, the difference between the classes cannot be identified. Accordingly, the event configuration optimizing unit 22 judges that the event configuration #3 does not satisfy the desired translation resolution.

FIG. 7C is an explanatory diagram of the event configuration #138.

In the event configuration #138, only the events E2, E4, and E8 are each denoted by 1 in binary notation value, and therefore binary notation values, translation contents, and decimal notation values of those three events are shown. In this case, all the values of event configurations respectively belonging to class 1, class 2, and class 3 are different from one another, which means that the values are not redundant in representation. Accordingly, the event configuration optimizing unit 22 judges that the difference between the classes can be identified in the event configuration #138, and therefore judges that the event configuration #138 satisfies the desired translation resolution.

FIG. 7D is an explanatory diagram of the event configuration #284.

In the event configuration #284, only the events E3, E4, E5, and E9 are each denoted by 1 in binary notation value, and therefore binary notation values, translation contents, and decimal notation values of those four events are shown. In this case as well, all the values of event configurations respectively belonging to class 1, class 2, and class 3 are different from one another, which means that the values are not redundant in representation. Accordingly, the event configuration optimizing unit 22 judges that the difference between the classes can be identified in the event configuration #284, and therefore judges that the event configuration #284 satisfies the desired translation resolution.

As described above, the event configuration optimizing unit 22 judges, with respect to all the event configurations, whether each event configuration satisfies the desired translation resolution.

FIG. 7E is an explanatory diagram showing the results of the judgment made on each event configuration as to whether the event configuration satisfies the desired translation resolution.

The event configuration optimizing unit 22 judges, with respect to all the event configurations, whether the event configuration satisfies the desired translation resolution, and then obtains, of the event configurations satisfying the desired translation resolution, the event configuration having a smallest log amount.

In the example of FIG. 7E, the event configurations of #138, #284, #1021, #1022, and #1023 each satisfy the desired translation resolution. Among those event configurations, the event configuration of #284 has a smallest log amount of 7.6 megabyte/hour. Accordingly, the event configuration optimizing unit 22 judges that the event configuration #284 is an optimal event configuration. Then, the event configuration optimizing unit 22 displays the calculated log amount in the estimated log amount field 2006 of the desired translation resolution input screen 2001, and waits an instruction to be given by the administrator. When the event configuration transmission button 2005 is pressed by the administrator, the event configuration optimizing unit 22 creates the event configuration information 1300 including the event configuration #284, and transmits the event configuration information 1300 to the PC 10.

As a result, the PC 10 transmits, from then on, event logs filtered based on the event configuration #284. In a case where the event logs created by the PC 10 are not filtered, in other words, a case where all the events are defined as valid, the PC 10 transmits the event logs in the log amount of 31.7 megabyte/hour, which corresponds to that of the event configuration #1023. In contrast, when filtered based on the event configuration #284, the event logs are transmitted in the log amount of only 7.6 megabyte/hour. In other words, the PC 10 transmits event logs each satisfying the desired translation resolution while having a smallest log amount. The management server 20 stores event logs each satisfying the desired translation resolution while having a smallest log amount.

Figure 8:
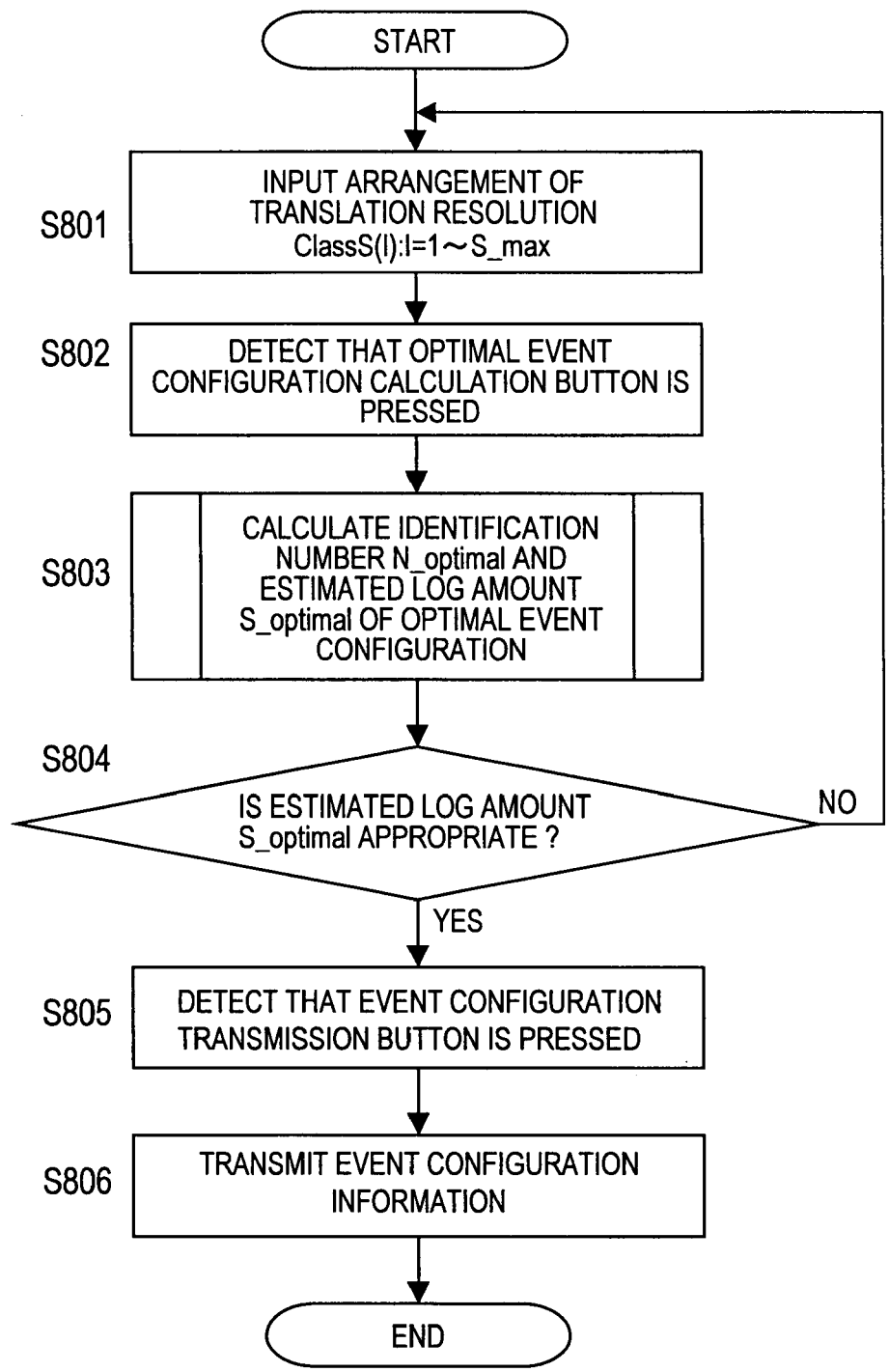
FIG. 8 is a flowchart of an optimal event configuration calculation process in accordance with the first embodiment of this invention.

FIG. 8 shows a flowchart of the optimal event configuration calculation process.

First, the event configuration optimizing unit 22 refers to the event configuration table and sets the arrangement of the binary numbers of the respective event configurations included in the event configuration table (S801). This arrangement is referred to as translation resolution arrangement Class S (/). In this case, / includes a value ranging from 1 to a maximum value S_max of a translation content S.

Next, the event configuration optimizing unit 22 waits until the administrator presses the optimal event configuration calculation button 2004 of the translation resolution input screen 2001. When the optimal event configuration calculation button 2004 is pressed (S802), the event configuration optimizing unit 22 executes the calculation process of calculating the optimal event configuration (S803). This calculation process is described in detail with reference to FIG. 9.

As a result of this calculation, an identification number (N_optimal) and an estimated log amount (S_optimal) of the optimal event configuration are obtained.

Next, the event configuration optimizing unit 22 displays, in the estimated log amount field 2006 of the translation resolution input screen 2001, the estimated log amount thus obtained, and judges whether or not the administrator has pressed the event configuration transmission button 2005 (S804).

In the case where the administrator has pressed the event configuration transmission button 2005 (S805), the event configuration optimizing unit 22 transmits, as the event configuration information 1300, an optimal event configuration corresponding to the identification number (N_optimal) thus obtained, to the PC 10 (S806).

Figure 9:
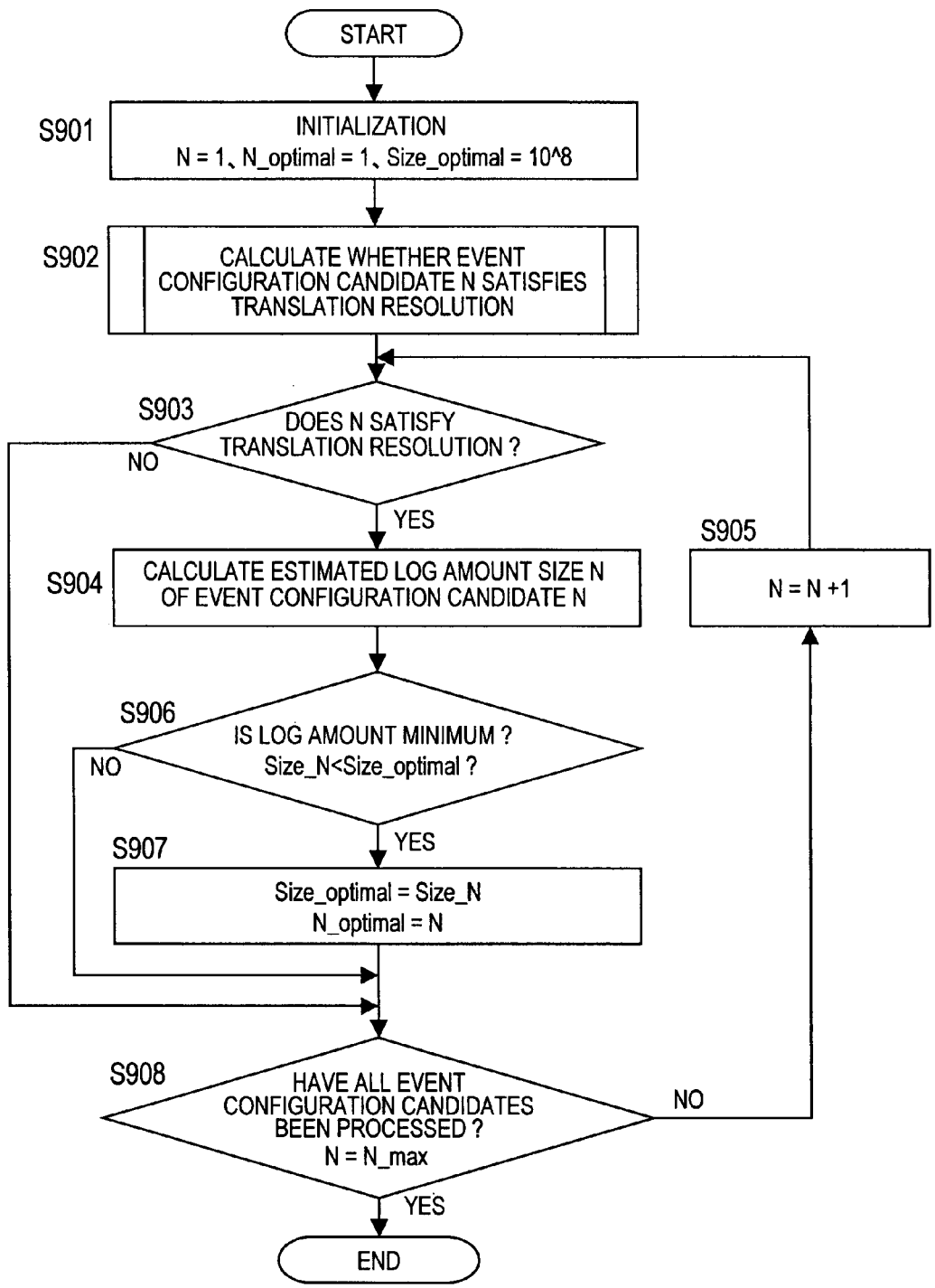
FIG. 9 is a flowchart of a calculation process in accordance with the first embodiment of this invention.

FIG. 9 shows a flowchart of the calculation process performed in Step S803 of FIG. 8.

The event configuration optimizing unit 22 first initializes variables or the like which are used in the calculation process (S901). Specifically, 1 is set to a variable N, 1 is set to the identification number N_optimal of the optimal event configuration, and a maximum value is set to the estimated log amount S_optimal of an optimal event candidate. An arbitral value may be set as the maximum value as long as the value is larger than the estimated log amount thus obtained. In this embodiment, the maximum value is set to $10^8$.

Next, the event configuration optimizing unit 22 executes a translation resolution calculation process of calculating whether an event configuration candidate N satisfies the translation resolution or not (S902). This process is described in detail with reference to FIG. 10. The event configuration candidate N corresponds to an N-th event configuration of all the event configurations extracted from the event translation map 23.

As a result of this translation resolution calculation process, the event configuration optimizing unit 22 judges whether the event configuration candidate N satisfies the desired translation resolution or not (S903). Specifically, it is judged whether the judgment result Hantei is True or False. In the case where the judgment result Hantei is Ture, in other words, the event configuration candidate N satisfies the translation resolution, the process proceeds to Step S904. In the case where the judgment result Hantei is False, in other words, the event configuration candidate N does not satisfy the translation resolution, the process proceeds to Step S908.

In Step S904, the event configuration optimizing unit 22 calculates an estimated log amount Size_N of the event configuration candidate N. Then, it is judged whether the estimated log amount Size_N is a minimum amount for the estimated log amount (S906). Specifically, it is judged whether or not the estimated log amount Size_N is smaller than the estimated log amount S_optimal of the optimal event candidate.

In the case where it is judged that the estimated log amount Size_N is smaller than the estimated log amount S_optimal of the optimal event candidate, the estimated log amount Size_N corresponds to a minimum amount for the estimated log amount at this point in time, and therefore the value of the estimated log amount Size_N is set to the estimated log amount S_optimal of the optimal event candidate (S907). On the other hand, in the case where the estimated log amount Size_N is equal to or larger than the estimated log amount S_optimal of the optimal event candidate, the estimated log amount S_optimal corresponds to a minimum amount for the estimated log amount at this point in time, and therefore, the process proceeds to Step S908 without executing Step S907.

In Step S908, the event configuration optimizing unit 22 judges whether the process has been completed with respect to all the event configuration candidates. Specifically, it is judged whether or not the variable N is equal to the N_max which corresponds to the number of all the event configuration candidates. In the case where it is judged the process has not been completed for all the event configuration candidates, 1 is added to N (S905), and the process returns to Step S903. In the case where it is judged that the process has been completed for all the event configuration candidates, the process is ended and returns to the flowchart of FIG. 8.

Figure 10:
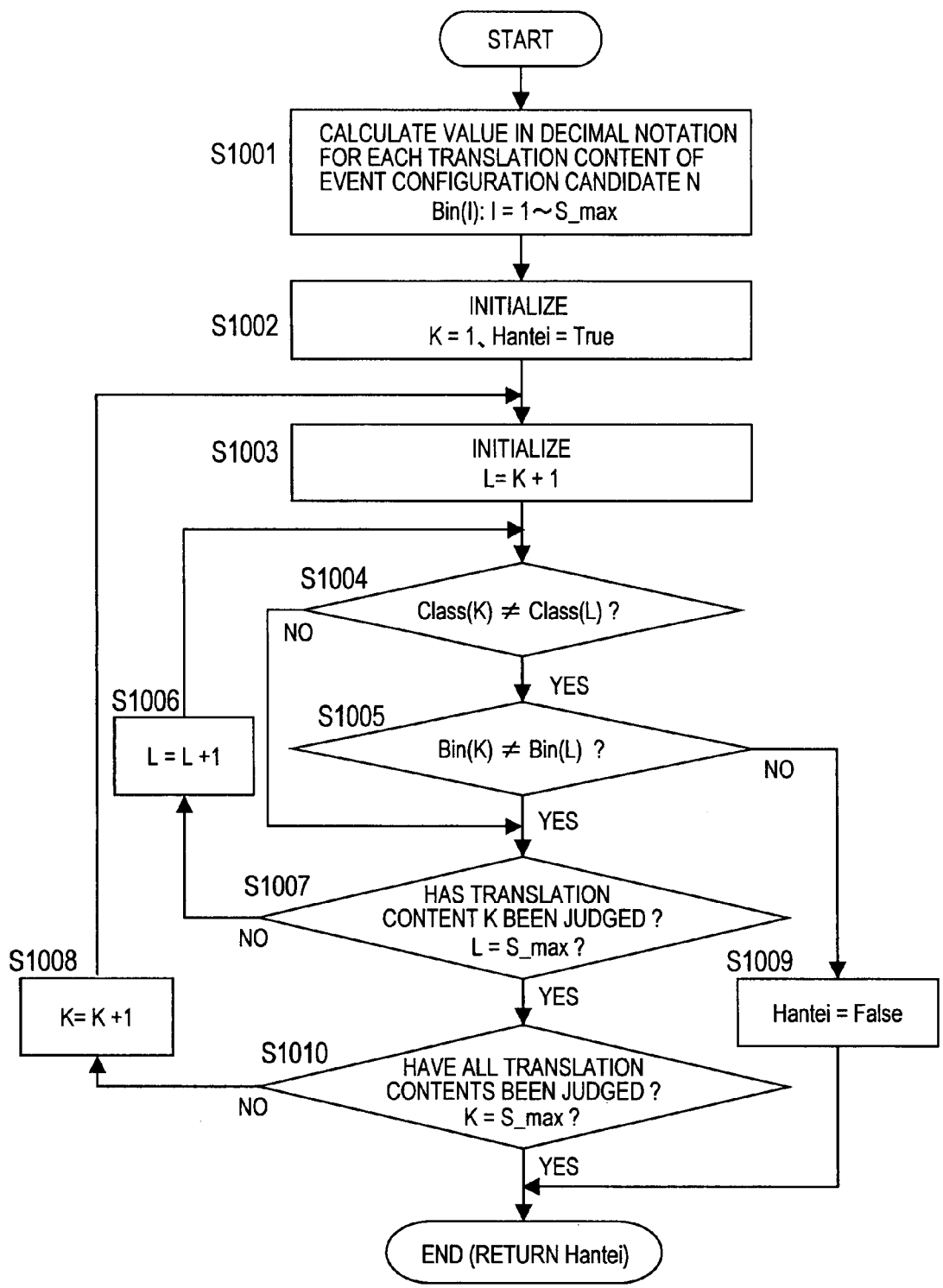
FIG. 10 is a flowchart of a translation resolution calculation process in accordance with the first embodiment of this invention.

FIG. 10 shows a flowchart of the translation resolution calculation process of Step S902 of FIG. 9.

The event configuration optimizing unit 22 first calculates a value in decimal notation for the translation content of the event configuration candidate N as a process target (S1001). The decimal notation value is represented by Bin (/), in which / includes a value ranging from 1 to a maximum value S_max of a translation content S.

Next, the event configuration optimizing unit 22 initializes variables or the like which are used in the translation resolution calculation process (S 1002). Specifically, 1 is set to a variable K, and Ture is set to the judgment result Hantei.

Then, the event configuration optimizing unit 22 sets a value obtained by adding 1 to the variable K, to a variable L (S1003). The initial value of the variable K is 1, and therefore 2 is set to the variable L as an initial value.

After that, the event configuration optimizing unit 22 judges whether the two classes (Class (K) and Class (L)) are identical with each other or not (S1004). This process is performed for judging whether the process has been completed for all the combinations of classes included in the current event configuration candidate. In the case where it is judged that Class (K) and Class (L) are different from each other, the process proceeds to Step S1005. In the case where Class (K) and Class (L) are not different from each other, in other words, K and L are both correspond to a value of S_max, which means that the process has been completed for all the combinations of the classes, the process proceeds to Step S1007 without executing Step S1005.

In Step S1005, the event configuration optimizing unit 22 judges whether the decimal notation values Bin (K) and Bin (L) are different from each other. It is indicated that, in other words, in the case where the same decimal notation value is shared by different classes in an event configuration, an event log for discriminating between the different classes cannot be obtained with the event configuration. Accordingly, in the case where the decimal notation values Bin (K) and Bin (L) are not different from each other, in other words, are identical with each other, it is judged that the current event configuration candidate N does not satisfy the desired translation resolution. In this case, False is set for the judgment result "Hantei" (S1009), and the profess returns to the flowchart of FIG. 9.

In the case where it is judged that the decimal notation values Bin (K) and Bin (L) are different from each other, the process proceeds to Step S1007. In Step S1007, the event configuration optimizing unit 22 judges whether the judgment has been completed on the translation content K. Specifically, it is judged whether or not the variable L corresponds to a maximum value S_max of the translation content. In the case where the variable L does not correspond to S_max, 1 is added to L (S1006), and the process returns to Step S1004. In the case where it is judged that the variable L corresponds to S_max, the process proceeds to Step S1010.

In Step S1010, it is judged whether the process has been completed for all the translation contents. Specifically, it is judged whether or not the variable K corresponds to the maximum value S_max of the translation content. In the case where the variable K does not correspond to the maximum value S_max of the translation content, 1 is added to K (S1008), and the process returns to Step S1003. In the case where the variable K corresponds to S_max, the process of this flowchart is ended, and the process returns to the flowchart of FIG. 9. In this case, the judgment result Hantei is not changed from its initial value of True.

Through the above-mentioned process, the event configuration information 1300 is calculated, and the event configuration information thus calculated is transmitted to the PC 10.

As described above, the first embodiment of this invention provides the job management system including the PC 10 on which a operator executes a job and the management server 20 for managing the event logs of the PC 10, in which the management server 20 is capable of automatically setting the categories for the event logs and the combination thereof which satisfy the translation resolution specified by the administrator while minimizing the data amount of the event logs to be transmitted by the PC 10 to the management server 20.

Second Embodiment

Next, a second embodiment of this invention is described.

The second embodiment relates to an information system for collecting, as event logs, sensor data created by a plurality of sensor nodes for detecting information indicating a status of a detected subject (such as a person or an object). It should be noted that constituent elements similar to those of the first embodiment are denoted by the same reference numerals, and the description thereof is omitted.

Figure 11:
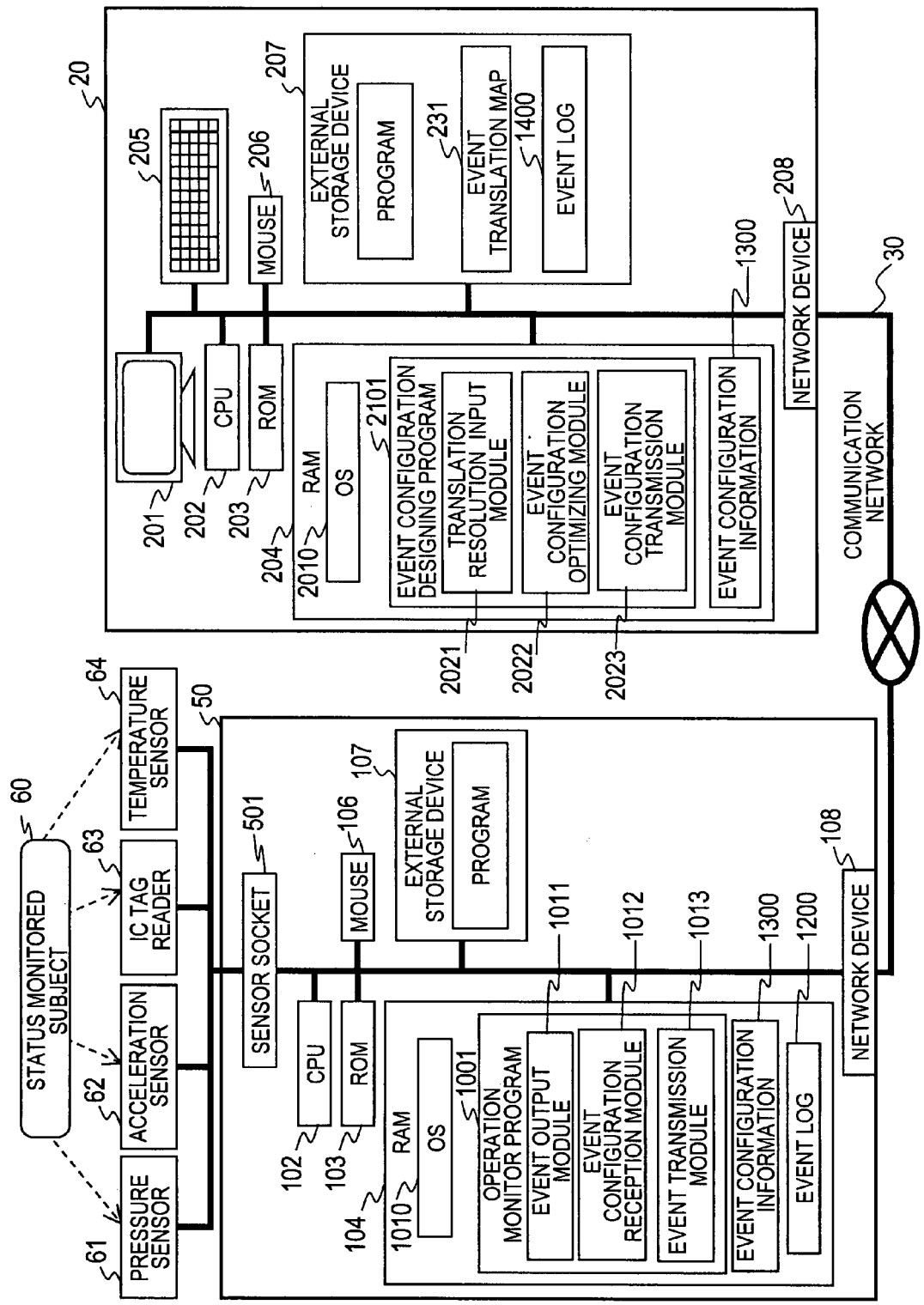
FIG. 11 is a configuration block diagram of an information system in accordance with a second embodiment of this invention.

FIG. 11 is a configuration block diagram of the information system according to the second embodiment.

The information system according to the second embodiment includes a sensor terminal 50 and a management server 20 which are connected to each other via a communication network 30.

The sensor terminal 50 is analogous to the PC 10 of the aforementioned first embodiment. The sensor terminal 50 does not include a display and a mouse, but includes a sensor socket 501 instead. With the sensor socket 501, the sensor terminal obtains events from various sensors of a status monitored subject 60. Specifically, the sensor terminal 50 connects, via the sensor socket 501, to a pressure sensor 61, an acceleration sensor 62, an IC tag reader 63, and a temperature sensor 64.

Each of those sensors obtains the status of the status monitored subject 60 (e.g., a person or a package). For example, the pressure sensor 61 detects a load applied by the status monitored subject 60 when the status monitored subject 60 has moved to the above of the pressure sensor 61, and creates an event. The acceleration sensor 62 detects, when the status monitored subject 60 has moved, an acceleration thereof, and creates an event. The IC tag reader 63 obtains information included in an IC tag provided to the status monitored subject 60, and creates an event. The temperature sensor 64 detects a temperature (body temperature) or the like of the status monitored subject 60, to create an event.

Those events are received, through the sensor socket 501, by the event output unit 11 implemented by the event output module 1011. The event output unit 11 transmits, to the filter unit 13 implemented by the event configuration module 1013, the events thus received as an event log in which the events are arranged in chronological order by time at which each event was created. The filter unit 13 filters the event log based on the event configuration information 1300 received by the event configuration reading unit 12 implemented by the event configuration reception module 1012, and transmits the filtered event logs to the management server 20 via the network device 108 and the communication network 30.

The management server 20 includes an event translation map 231 to deal with the event logs created by the sensor terminal 50.

According to the first embodiment, the event translation map 23 includes translation contents corresponding to the operations logs of the jobs executed on the PC 10. This translation contents are specialized for a personal computer so as to correspond to the operation of the keyboard 105 or the mouse 106.

In contrast, according to the second embodiment, the event translation map 231 includes translation contents corresponding to statuses to be obtained by the respective sensors. For example, the translation contents are configured such that the position of the status monitored subject 60 can be specified based on the detection result of the pressure sensor 61 and the detection result of the acceleration sensor 62, or the detailed information on the status monitored subject 60 can be obtained based on the detection result of the IC tag reader 63.

The subsequent processes are similar to those of the aforementioned first embodiment.

The management server 20 calculates the event configuration information 1300 based on the desired translation resolution 2000 input by the administrator and on the contents of the event translation map 231, and transmits the event configuration information 1300 to the sensor terminal 50. The sensor terminal 50 filters the event logs based on the event configuration information 1300 as described above, and transmits the filtered event logs to the management server 20.

As described above, the second embodiment of this invention provides the information system including the sensor terminal 50 provided with a plurality of sensor nodes and the management server 20, in which, similar to the first embodiment, the management server 20 is capable of automatically setting categories for the event logs and the combination thereof which satisfy the translation resolution specified by the administrator while minimizing the data amount of the event logs to be transmitted by the sensor terminal 50 to the management server 20.

While the present invention has been described in detail and pictorially in the accompanying drawings, the present invention is not limited to such detail but covers various obvious modifications and equivalent arrangements, which fall within the purview of the appended claims.

What is claimed is:

1. A job management system, comprising:
    a terminal for executing a job, and for collecting operation information corresponding to respective operations executed by an operator; and
    a management server for managing the operation information collected by the terminal, the management server being connected to the terminal via a network:
    wherein the terminal transmits, to the management server, operation log data including the operation information capable of identifying the corresponding operations executed by the operator;
    wherein the management server stores, in advance, information indicating categories for the operation information and combinations thereof which are used for interpreting the operation information transmitted from the terminal as the corresponding operation executed by the operator with respect to the terminal;
    wherein the management server selects categories for operation information and a combination thereof which minimize a data size of the operation log data to be transmitted by the terminal;
    wherein the management server comprises an input unit that receives information indicating a group of operations input by an administrator, which are interpreted as identical operation; and
    wherein the management server further comprises an optimizing unit that selects, from among all the categories for the operation information and combinations thereof that are capable of identifying the group, the categories for the operation information and the combination thereof that minimize the data size of the operation log data to be transmitted by the terminal.

2. The job management system according to claim 1, wherein: the terminal comprises:
    an output unit for outputting collected operation information as the operation log data which is capable of identifying the corresponding operations executed by the operator through an operation of one of a keyboard and a mouse;
    a selection unit for selecting operation information included in the operation log data, based on the categories for the operation information and the combination thereof selected by the management server; and
    a transmission unit for transmitting the operation log data including the selected operation information to the management server; and
the management server comprises:
    a storage unit for storing the operation log data transmitted from the terminal.

3. The job management system according to claim 2, wherein the storage unit stores, in advance, correspondence information indicating relationship among the categories for the operation information and the combinations thereof, the operations executed by the operator with respect to the terminal, and statistical information on a data size for each category for the operation information.

4. The job management system according to claim 2, wherein:
    the storage unit stores, in advance, correspondence information indicating relationship among the categories for the operation information and the combinations thereof, the operations executed by the operator with respect to the terminal, and statistical information on a data amount for each category for the operation information; and the optimizing unit selects
    the categories for the operation information and the combination thereof which minimize the data size of the operation log data to be transmitted by the terminal with reference to the correspondence information.

5. A job management method, which is executed in a job management system including: a terminal for executing a job, and for collecting operation information capable of identifying respective operations executed by an operator; and
    a management server for managing the operation information collected by the terminal, the management server being connected to the terminal via a network, the method comprising:
    transmitting, to the management server, operation log data including the operation information capable of identifying the corresponding operations executed by the operator;
    storing, in advance, information indicating categories for the operation information and combinations thereof, which are used for interpreting the operation information transmitted from the terminal as the corresponding operation executed by the operator with respect to the terminal;
    selecting categories for operation information and a combination thereof which minimize a data size of the operation log data to be transmitted by the terminal;
    receiving, from an administrator, information indicating an input of a group of operations which are interpreted as identical with one another, of all the operations interpreted; and
    selecting, from among all the categories for the operation information and combinations thereof which are capable of identifying the group, the categories for the operation information and the combination thereof that minimize the data size of the operation log data to be transmitted by the terminal.

6. The job management method according to claim 5, further comprising:
    collecting, by the terminal, the operation information capable of identifying the corresponding operations executed by the operator through an operation of one of a keyboard and a mouse,
    outputting the collected operation information as the operation log data; selecting, by the terminal operation information included in the operation log data, based on the categories for the operation information and the combination thereof selected by the management server; and
    transmitting, by the terminal, the operation log data including the selected operation information to the management server; and
    storing, by the management server, the operation log data transmitted by the terminal.

7. The job management method according to claim 6, further comprising storing, in advance, correspondence information indicating relationship among the categories for the operation information and the combinations thereof, the operations executed by the operator with respect to the terminal, and statistical information on a data size for each category of the operation information.

8. The job management method according to claim 6, further comprising:
    storing, in advance, correspondence information indicating relationship among the categories for the operation information and the combinations thereof, the operations executed by the operator with respect to the terminal, and statistical information on a data amount for each category of the operation information;

inputting, by the administrator, information indicating a group of operations input by the administrator, which are interpreted as identical operation; and selecting the categories for the operation information and the combination thereof which minimize a data size of the operation log data to be transmitted by the terminal with reference to the correspondence information.

* * * * *